April 16, 1968 K. TRAUB ET AL 3,378,794

ELECTROMECHANICAL TRANSDUCER AND FILTER

Filed May 19, 1964

United States Patent Office 3,378,794
Patented Apr. 16, 1968

3,378,794
ELECTROMECHANICAL TRANSDUCER AND FILTER

Karl Traub and Johann Magerl, Munich, Germany, assignors to Siemens Aktiengesellschaft, Munich, Germany Filed May 19, 1964, Ser. No. 368,716
18 Claims. (Cl. 333—71)

ABSTRACT OF THE DISCLOSURE

A pair of electrostrictive plate members is interposed in an elastically bendable vibrator structure such as between two coaxially aligned portions of a bar or rod of steel or quartz glass. The conductively coated faces of each electrostrictive member extend transverse to the neutral bending axis of the vibrator structure. The two members of the pair are spaced laterally from and, located on opposite sides of the axis and are electrically polarized in mutually opposed directions substantially parallel to the axis. Two such pairs of electrostrictive members may be provided in axially spaced relation to form part of a vibration excitation circuit and part of a voltage output circuit respectively. The transducer structure may also be designed as a tuning fork whose tines incorporate the electrostrictive members.

The invention relates to an electromechanical bending vibrator which, through small plates or blocks of electrostrictive material provided with electrically conducting coatings, is designed as a transducer for translating electrical oscillations into mechanical bending vibrations and vice versa, and preferably is provided as an end vibrator of a multipart electromechanical filter.

Electromechanical vibrators are often employed in the construction of mechanical filters which are utilized, for example, as channel filters in carrier frequency engineering. Further, electromechanical vibrators, because of their high electrical quality and their small dimensions, are also utilized in selective amplifiers and oscillators. For a frequency range below 50 kc. favorable dimensions are especially achieved with bending vibrators. Such bending vibrators usually comprise a steel bar on whose surface there is attached an electrostrictive ceramic, whereby the vibration excitation takes place over the so-called transverse piezo effect, since the expansions and contractions of the electrostrictive ceramic occurring transversely to the direction of the electric field cause bending of the steel bar. The natural frequency of the electrostrictive material, however, has a temperature coefficient about 100 times poorer than that of steel. Also the electrical quality of the electrostrictive material is considerably less than that of the steel by a factor of about 40. The temperature stability and the quality of a vibrator built up in this manner therefore depends very greatly on the selected ratio which the electrostrictively active material and the electrostrictively inactive material bear to one another. This ratio, however, determines the electromechanical coupling factor since only the electrostrictively active material contributes to the conversion of electrical oscillations into mechanical vibrations. For example, in filter circuits with mechanical vibrators the maximally achievable and width is determined by such coupling factor. Hence, one cannot go below a minimum value of vibrator stability for a given filter band width. Furthermore, the temperature dependence and loss angle of the parallel capacitance formed by the electrostrictive material require improvement by insertion of a capacitor; but this again entails a reduction of the coupling factor. These various disadvantages considerably restrict the utilization possibilities of bending vibrators excited by the transverse piezoelectric effect.

The invention has among its objects to alleviate the above-mentioned difficulties in a relatively simple manner.

According to the invention, we proceed from an electromechanical bending vibrator which has plates or blocks of electrostrictive material provided with electrically conductive coatings and is designed as a transducer for translating electrical vibrations into mechanical bending vibrations and vice versa, preferably for use as an end vibrator of a multipart electromechanical filter; and we dispose between the plane formed by the neutral axis of the bending vibrator and its outer peripheral surface at least one plate or block member of electrostrictive material preferably within the area defined by two vibration nodes, and there is impressed on the electrostrictive members a polarization running perpendicular to the planes formed by the electrically conductive coatings.

It is advantageous to provide one or two pairs of such electrostrictive members, the two members of a pair being located on transversely opposite sides of the neutral fiber or bending axis of the elastically bendable structure and preferably in a cross-sectional plane of the bending structure. The two members, preferably, are polarized in mutually opposed directions parallel to the neutral axis.

According to another feature of the invention, a quadrupole is formed by providing two of such electrostrictive excitation systems in a single elastically bendable vibrator structure, preferably symmetrically to the point of maximal deflection of the bending vibrator.

A good form of construction for practical use, is one in which each block of electrostrictive material is subdivided by a metal layer, preferably of silver which extends parallel to the conductively coated end faces of the block, the conducting layer being provided with a connecting wire.

It is advantageous if the polarization of the blocks disposed below the neutral axis is so selected, in reference to the polarization of the block disposed above the neutral axis, that the output voltage is either in phase or in counterphase with the exciting voltage.

Preferably steel or quartz glass is employed as material for the vibrator structure which is preferably given a round or rectangular cross-sectional configuration.

Further, the electromechanical transducer according to the invention can be designed as a fork resonator, in which in at least one tuning fork leg is provided with opposingly polarized electrostrictive members located on laterally opposite sides of the neutral axis. If such an excitation system is located in each of the two fork legs, the polarization of the electrostrictive members is preferably so selected that the output voltage is in phase or in counterphase, with the exciting voltage.

In the drawings, wherein like reference characters indicate like or corresponding parts:

FIGS. 5, 6 and 7 are electrical equivalent circuit diagrams, FIGS. 5 and 6 illustrating respective circuits for a transducer as illustrated in FIG. 4, operated as a bipole, while FIG. 7 illustrates such a circuit for operation as a quadrupole.

Figure 1:
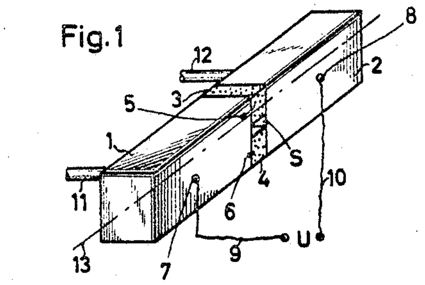
FIG. 1 is a perspective view of a transducer embodying the features of the invention.

The transducer illustrated in FIG. 1 comprises a straight bar mechanical bending vibrator which consists of block-shaped steel parts 1 and 2 connected with each other through two blocks or plate members 3 and 4 of an electrostrictive material, for example, by soldering. The electrostrictive material is so disposed within the cross-section of the vibrator that between the blocks 3 and 4 along the neutral axis 13 there remains a gap S. Preferably used as electrostrictively active material is a lead ceramic (lead zirconate), such as is available under the trade name "PZT 6" from the Clevite corporation. This ceramic is especially well suited because its Curie point lies above 300° C. so that a polarization impressed on the ceramic blocks is not impaired by the soldering process employed for joining the steel parts with the ceramic blocks. To assure flawless soldering, the ceramic blocks 3 and 4 have their respective sides facing the steel parts coated with silver, which can be applied in the usual manner, for example by vaporization in a vacuum. The silver coatings also serve as electrodes for applying the polarization voltage to the ceramic blocks. In the vibrator illustrated in FIG. 1, the polarization impressed on the ceramic blocks by pretreatment with a direct current is in the directions indicated by the arrows 5 and 6. That is, the polarization directions are both parallel to the axial direction of the vibrator, the block 3 above the neutral axis being polarized in opposition to the polarization of the block 4 below the neutral axis. Thin wires 9 and 10 for supplying an alternating voltage U are soldered to the respective steel parts 1 and 2 at points located in the vibration nodes 7 and 8. Also attached to the same vibration nodes are wire studs 11 and 12 which serve for transmitting the bending vibration to other mechanical resonators or for anchoring the vibrator in a casing, not illustrated. If additional mechanical resonators are connected to the studs 11 and 12, the vibrator can be regarded as the end vibrator of a multipart mechanical filter.

Figure 2:
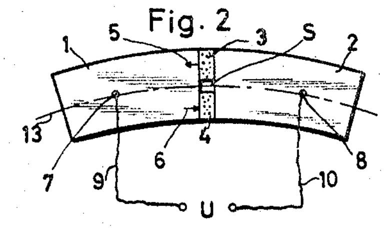
FIG. 2 is an elevational view of the transducer illustrated in FIG. 1, with a voltage operatively applied thereto.

FIG. 2 illustrates the effect of an alternating voltage U applied to the steel parts 1 and 2 between the vibration nodes 7 and 8, the frequency of the voltage being substantially tuned to the natural frequency of the vibrator. Corresponding to the polarization impressed on the electrostrictive blocks, indicated by the arrows 5 and 6, the block 3 above the neutral axis expands under the influence of the electric field, while the block 4 below the neutral axis contracts under the influence of the electric field. As a result, the vibrator is bent as is indicated in FIG. 2. When the polarity of the applied alternating voltage reverses the block 3 contracts, while block 4 expands, so that the vibrator bends in the opposite direction. The vibrator thus executes bending vibrations in the rhythm of the applied alternating voltage, and symmetrically to a plane determined by the vibration nodes 7 and 8. In order to prevent the excitation of interfering vibrations, the ceramic blocks 3 and 4 are separated along the neutral axis 13 so as to form the gap S. This is necessary because the forces acting in the direction of the bar axis reverse their sign at the neutral axis.

As is apparent from FIG. 2, the expansions and contractions of the electrostrictive blocks generated by the electric alternating field, agree with the direction of the push and pull forces occurring during bending, so that the vibrational excitation involves the so-called longitudinal piezo effect. Because of the interrelation between the longitudinal expansion and the transverse contraction, as represented by the Poisson number, the utilization of the longitudinal piezo effect permits attaining a coupling factor about three times greater than with a comparable vibrator excited by the transverse piezo effect; or the same coupling factor can be secured with an amount of electrostrictive material which is smaller by about the square of the Poisson number, thus achieving a considerable improvement in temperature stability and quality factor (ratio of reaction to loss resistance) of the vibrator. Since the surface area on which electrostrictive material and steel abut against each other, diminish considerably with respect to a comparable vibrator excited through the transverse effect, the disturbing effect of the soldering layer upon the constancy of the vibrator is also reduced. The coupling factor can also be influenced by simply arranging the ceramic blocks 3 and 4 at an angle differing from 90° with respect to the vibrator axis.

Figure 3:
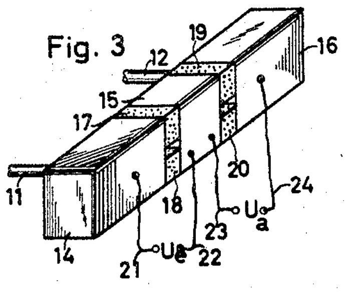
FIGS. 3 and 4 are views, similar to FIG. 1, illustrating further modifications of the invention.

A further development of the excitation system of the invention is illustrated in FIG. 3, wherein the vibrator is composed of the steel parts 14, 15 and 16 which are firmly soldered to the electrostrictive blocks 17, 18, 19 and 20. Wires 11 and 12 are attached in the vibration nodes for supporting the system in a casing. The vibration excitation takes place in the manner previously described through the application of an electrical alternating voltage $U_e$ to the steel parts 14 and 15. Due to the bending vibration of the bar, the electrostrictive blocks 19 and 20 are expanded and contracted and as a result of the piezo effect there appears between the steel parts 15 and 16 an alternating voltage $U_a$, which can be taken from the wires 23 and 24. Since the wires 22 and 23 must be attached to the most deflective middle part 15 of the vibrator, these two wires, which may also be combined to a single line, are preferably so light and flexible that their slight mass, does not affect the bending vibrations of the resonator.

Figure 4:
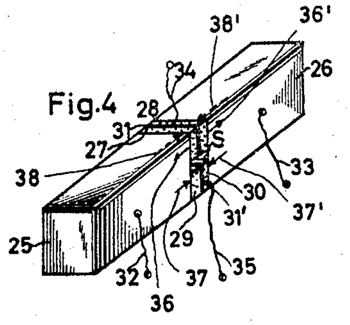

In the embodiment of FIG. 4, the vibration is excited by means of an electrostrictive material whose Curie point lies below the soldering temperature. A well-known material of this kind, for example, is calcium-barium-titanate. The vibrator is composed of two steel parts 25, 26 and four electrostrictive blocks 27, 28, 29 and 30. The electrostrictively active material is so disposed within the cross-sectional area of the vibrator that a gap S remains along the neutral axis. The blocks 27 and 28, and the blocks 29 and 30 are arranged on both sides of electrically conducting layers 31 and 31', which consist preferably of silver and which are deposited by vaporization in the usual manner. In the vibration nodes there are attached feed wires 32 and 33, which if made sufficiently strong may also serve for mounting the vibrator in a casing, omitted in the drawing. The silver coatings 31 and 31' are provided with additional feed wires 34 and 35. The subdivision of the electrostrictive material by the silver coatings 31 and 31' is necessary as the polarization voltage can only be applied when the individual components of the vibrator are soldered together. A polarization impressed on ceramic blocks 27 to 30 before the soldering process would be subsequently rendered ineffective by the soldering operation, since the Curie temperature of the calcium-barium-titanate is lower than the necessary soldering temperature. As the electrostrictive blocks 27 to 30 form an insulating interlayer, the silver layers 31 and 31' are not disposed in electrically conducting connection with the steel parts 25 and 26, whereby the polarization voltage can be applied between the silver coatings and the steel parts after completion of the entire vibrator.

Figure 5:
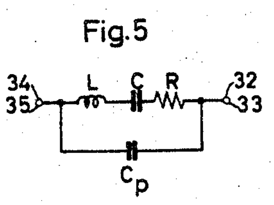

FIG. 5 illustrates the electrical equivalent circuit diagram of the bending vibrator shown in FIG. 4, if the polarization direction of the electrostrictive blocks is assumed in the directions indicated by arrows 36, 36', 37 and 37'. If the feed wires 34 and 35 are connected together, with one pole of the voltage source connected thereto, and the feed wires 32 and 33 are connected together, with the other pole of the voltage source connected thereto, there then results the equivalent circuit diagram of a series vibratory circuit with the inductance L, the capacitance C and an ohmic loss resistance R, a capacitance $C_p$ being connected in parallel to the series circuit.

If the vibrator is to be operated in connection with devices whose input or output ohmic resistances are relatively high, then only the wire 34 is connected with one pole of the voltage source, and the wire 35 with the other pole. If the polarization direction is, in this case, assumed in the directions indicated by the arrow pair 37 and 37' and the arrow pair 38 and 38', there results the equivalent circuit diagram illustrated in FIG. 6, which again consists of a loss-loaded series resonance circuit, to which a capacitance is connected in parallel. However, in this circuit the resistance values of the series resonance circuit are greater by a factor of 4 than those of the equivalent circuit diagram of FIG. 5, so that the series resonant circuit consists of an inductance 4L, a capacitance $C/4$ and an ohmic loss resistance 4R. The parallel capacitance has the value $C_p/4$. The quality of a vibrator connected in this manner does not change in the process, since the quality is determined exclusively by the ratio of the reactance to the loss resistance. It is advantageous that this type of circuit permits dispensing with matching transformers, otherwise necessary in such cases.

Figure 7:
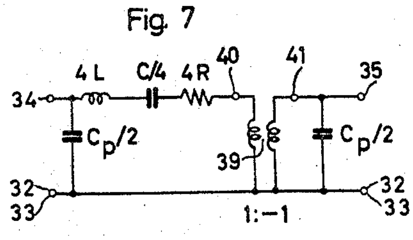

The vibrator illustrated in FIG. 4 can also be operated as an electrical quadrupole. The corresponding electrical equivalent circuit diagram is depicted in FIG. 7. In this type of arrangement, the wires 32 and 33 are connected with each other, one pole of the exciting voltage being connected to the wire 34 attached tot he silver coating 31, while the other pole is connected to the two interconnected wires 32 and 33. The output voltage can be obtained at the wire 35 connected to the silver coating 31 and the connection between wires 32 and 33. If the polarization is as indicated in FIG. 4 by arrows 36, 36', 37 and 37' there results an equivalent circuit diagram with an input transverse capacitance $C_p/2$, a longitudinal series resonant circuit with the inductance 4L, the capacitance $C/4$ and the loss resistance 4R, a shunt capacitance $C_p/2$ extending across the output. An ideal transformer 39 of the transformation ratio 1:—1 is shown interposed between the output shunt capacitance and the longitudinal series circuit, which merely means that at the resonance frequency of the vibrator the output voltage is in counterphase to the input voltage. If, however, a like polarization of the electrostrictive blocks disposed on both sides of the neutral axis is selected, as indicated in FIG. 4 by the arrow pair 38 and 38' drawn in broken lines, and the arrow pair 37 and 37' in the equivalent circuit diagram of FIG. 7, the ideal transformer 39 is to be eliminated in the diagram and the terminals 40 and 41 are to be directly connected with each other. With the latter polarization of the electrostrictive ceramic blocks the input and output voltage are exactly in phase at the resonance frequency of the vibrator.

Figure 6:
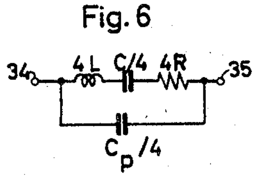

The considerations leading to the equivalent circuit diagrams according to FIGS. 5 to 7 are analogously applicable to the bending vibrator illustrated in FIG. 3 which, depending on the practical requirements, may be operated as a bipole or as a quadrupole. In this embodiment, too, the polarization of the electrostrictive blocks 19 and 20 can be the same as, or opposed to the polarization of the blocks 17 and 18, provided the polarization of the blocks above the neutral axis is opposed to that of the blocks below the neutral axis.

If, in the embodiment of FIG. 3, the electrostrictive blocks are arranged asymmetrically to the point of maximal deflection, and the blocks 19 and 20 are of a different thickness than the blocks 17 and 18, the ideal transformer 39 in the equivalent circuit diagram of FIG. 7 assumes a transformation ratio $1:u$ or $1:-u$, depending upon the particular polarization; that is, the ratio then differs from the unity value. The respective values of the input and output shunt capacitances are different although their sum still corresponds to the total shunt capacitance according to the equivalent circuit diagram.

In the embodiments described with reference to FIGS. 1 to 4, the resonator body material was assumed to be made of steel and to have a rectangular cross-section. Practically the same electrical relations result when the resonator material consists of an electrically nonconducting material having a high quality factor, for example quartz glass, and also when the resonators have a circular cross-section.

Figure 8:
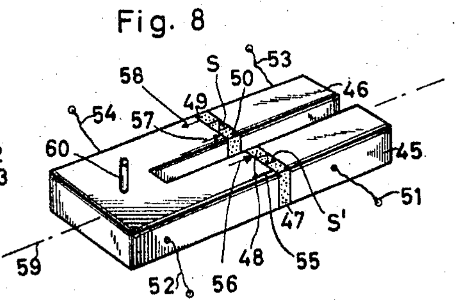
FIG. 8 illustrates the application of the invention to a tuning fork resonator.

The tuning fork resonator according to the invention illustrated in FIG. 8, may be employed to advantage where relatively low frequencies are involved and the correspondingly great length of a straight bar-shaped vibrator would be undesirable. Since in the base portion of the tuning fork there is present a point at which practically no movement occurs, the fork can be extremely rigidly attached at this point to a casing. Thin blocks 47, 48, 49 and 50 of electrostrictive material are disposed in the cross-sectional area of the tuning fork legs 45 and 46 consisting of steel. The blocks are so positioned along the neutral axis that gaps S and S' remain. To the tuning fork legs there are attached feed wires 51, 52, 53 and 54 for the application of an electric voltage. The polarization of the individual blocks is so selected that in each case the respective blocks lying on opposite sides of the neutral axis are opposingly polarized, as is indicated by the arrow pair 55 and 56 or by the arrow pair 57 and 58. The application of an electrical alternating voltage, for example to the wires 51 and 52, cause the legs to execute pronounced bending vibrations symmetrically to the centerline 59. At the relatively stationary point of the tuning fork base, that is, at the point in which practically no movement occurs, a supporting wire stud 60 is provided, which may serve for anchoring the tuning fork resonator in a casing (not illustrated). Depending on the type of electrostrictive ceramic used, the blocks 47 to 50 (as in the embodiment of FIG. 4) can be subdivided by an electrically conducting layer. If the tuning fork resonator is operated exclusively as a bipole, the excitation system arranged in leg 46 can be dispensed with. If the resonator is operated as a quadrupole, the output voltage can be obtained at wires 53 and 54, the input voltage then being applied between the wires 51 and 52. Depending on the allocation of the polarization of the blocks disposed in the tuning fork leg 46 with respect to the polarization of the electrostrictive blocks disposed in leg 45, the output voltage at the resonance frequency of the fork is either in phase with, or in counterphase to, the input voltage.

Changes may be made within the scope and spirit of the appended claims which define what is believed to be new and desired to have protected by Letters Patent.

We claim:

1. An electromechanical transducer comprising elastically bendable structure capable of vibrating at a natural frequency and having a neutral bending axis; at least one plate member of electrostrictive material inserted in said structure in laterally spaced relation to said axis, and having conductively coated end faces transverse to said axis and joined with said structure, said member having an impressed electric polarization substantially parallel to said axis; and voltage conductor means in conductive connection with the respective coatings on said end faces of said member.

2. An electromechanical transducer according to claim 1, comprising elastically bendable structure capable of vibrating at a natural frequency and having a neutral bending axis and vibration nodes spaced along said axis; at least one plate member of electrostrictive material inserted in said structure in laterally spaced relation to said axis, and having two conductively coated end faces transverse to said axis and firmly joined with said structure, said member located in a region of said structure intermediate and spaced from said nodes and having an impressed electric polarization substantially parallel to said axis; said mutually insulated voltage conductor means in conductive connection with said two coatings of said member.

3. A transducer according to claim 1, comprising two of said electrostrictive members on transversely opposite sides of said neutral axis, said electric polarization of one of said two members being opposed to the polarization of said other member.

4. In a transducer according to claim 1, said elastically bendable structure comprising two metal bars axially aligned with each other, said electrostrictive member being located axially between said bars and having said respective coatings conductively joined with said bars, and said voltage conductor means being attached to said two bars respectively.

5. In a transducer according to claim 1, said elastically bendable structure comprising two metal bars axially aligned with each other, two of said electrostrictive members being located axially between said bars and having said respective coatings conductively joined with said bars, said two members forming between each other a gap traversed by said axis, and said electric polarization of one of said two members being opposed to the polarization of said other member.

6. In a transducer according to claim 1, said elastically bendable structure comprising two metal bars axially aligned with each other and there being two pairs of said electrostrictive members interposed between said two bars and joining them together, the two members of each pair being transversely spaced from each other on laterally opposite sides respectively of said axis; and said voltage conductor means forming respectively a vibration excitation circuit with one of said two pairs of electrostrictive members and a voltage output circuit with said other pair of members.

7. In a transducer according to claim 1, said elastically bendable structure comprising two metal bars axially aligned with each other and a metal block located intermediate said two bars, each of said bars containing one of said respective vibration nodes and said block forming the locality of maximum bending deflection of said structure; a pair of said electrostrictive members being located between said block and each of said two bars so as to join said block and bars together; the two members of each pair being transversally spaced from each other on opposite sides respectively of said axis; and said voltage conductor means forming respectively a vibration excitation circuit with one of said two pairs of electrostrictive members and a voltage output circuit for said other pair of members.

8. In a transducer according to claim 1, said electrostrictive plate member comprising a metallic layer subdividing said plate member in parallel relation to said conductively coated end faces so as to form two component members joined to a single plate; and said voltage conductor means comprising a conductor attached to said metallic layer.

9. In a transducer according to claim 8, said layer in said electrostrictive plate member being formed of silver.

10. In a transducer according to claim 5, the polarization of said members on one side of said axis being directionally related to the polarization of said members on the other side in accordance with the in-phase relation between the respective voltages of said two circuits.

11. In a transducer according to claim 5, the polarization of said members on one side of said axis being directionally related to the polarization of said members on the other side in accordance with a counter-phase relation between the voltage of said excitation circuit and the output voltage of said other circuit.

12. In a transducer according to claim 1, said structure consisting substantially of steel.

13. In a transducer according to claim 1, said structure consisting substantially of electrically non-conducting material.

14. In a transducer according to claim 13, said structure consisting substantially of quartz glass.

15. In a transducer according to claim 1, said structure having a substantially rectangular cross section.

16. In a transducer according to claim 1, said structure forming a tuning fork resonator having a bight portion and fork tines with a vibration node in the bight portion, said electrostrictive member being inserted in at least one of said tines.

17. In a transducer according to claim 16, each of said tines comprising one of said inserted electrostrictive members, said conductor means forming a vibration excitation circuit and a voltage output circuit with said respective two members, and the polarization of said respective members being directionally correlated in accordance with an in-phase relation between the respective voltages of said two circuits.

18. In a transducer according to claim 16, each of said tines comprising one of said inserted electrostrictive members, said conductor means forming a vibration excitation circuit and a voltage output circuit with said respective two members, and the polarization of said respective members being directionally correlated in accordance with a counter-phase relation between the respective voltages of said two circuits.

References Cited

UNITED STATES PATENTS

| | | | |
|---|---|---|---|
| 2,571,019 | 10/1951 | Donley et al. | 333—71 |
| 2,695,357 | 11/1954 | Donley | 333—71 |
| 2,895,061 | 7/1959 | Probus | 310—8.2 |
| 3,142,027 | 7/1964 | Albsmeir et al. | 333—72 |

ROY LAKE, *Primary Examiner.*

DARWIN R. HOSTETTER, *Examiner.*